US012706326B2

(12) United States Patent
Li et al.

(10) Patent No.: US 12,706,326 B2
(45) Date of Patent: Aug. 11, 2026

(54) ELECTROCHEMICAL APPARATUS AND ELECTRONIC APPARATUS INCLUDING SAME

(71) Applicant: Ningde Amperex Technology Limited, Ningde City (CN)

(72) Inventors: Wenqiang Li, Ningde City (CN); Jian Liu, Ningde City (CN); Chao Tang, Ningde City (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 630 days.

(21) Appl. No.: 18/087,033

(22) Filed: Dec. 22, 2022

(65) Prior Publication Data

US 2023/0207885 A1 Jun. 29, 2023

(30) Foreign Application Priority Data

Dec. 28, 2021 (CN) ......................... 202111625221.4

(51) Int. Cl.
*H01M 10/0569* (2010.01)
*H01M 4/04* (2006.01)
*H01M 10/0567* (2010.01)
*H01M 10/0568* (2010.01)
*H01M 4/02* (2006.01)

(52) U.S. Cl.
CPC ..... *H01M 10/0569* (2013.01); *H01M 4/0404* (2013.01); *H01M 10/0567* (2013.01); *H01M 10/0568* (2013.01); *H01M 2004/021* (2013.01); *H01M 2004/028* (2013.01); *H01M 2300/0037* (2013.01); *H01M 2300/0051* (2013.01)

(58) Field of Classification Search
CPC .. H01M 4/04; H01M 4/0404; H01M 10/0567; H01M 10/0568; H01M 10/0569
USPC .................................................. 429/324, 326
See application file for complete search history.

(56) References Cited

U.S. PATENT DOCUMENTS

| | | | |
|---|---|---|---|
| 2019/0214680 A1 | 7/2019 | Bo et al. | |
| 2023/0070028 A1 | 3/2023 | Xu et al. | |
| 2024/0106002 A1 | 3/2024 | Li et al. | |

FOREIGN PATENT DOCUMENTS

| | | | |
|---|---|---|---|
| CN | 111477964 | A | 7/2020 |
| CN | 111490291 | A | 8/2020 |
| CN | 111640984 | A | 9/2020 |
| CN | 111477964 | B | 6/2021 |
| CN | 113206296 | A | 8/2021 |
| CN | 113241477 | A | 8/2021 |
| CN | 113707867 | A | 11/2021 |
| JP | 2007-080619 | A | 3/2007 |
| KR | 20130047801 | A | 5/2013 |
| WO | 2021180135 | A1 | 9/2021 |
| WO | 2021/226842 | A1 | 11/2021 |

OTHER PUBLICATIONS

Office Action dated May 21, 2024, issued in counterpart BR Application No. BR102022026740-5. (4 pages).
Office Action dated Nov. 23, 2023, issued in counterpart CN Application No. 202111625221.4, with English translation. (14 pages).
Office Action dated Apr. 18, 2024, issued in counterpart CN Application No. 202111625221.4. (6 pages).
Extended (Supplementary) European Search Report dated Aug. 16, 2023, issued in counterpart EP Application No. 22215623.4. (3 pages).
Zhu, Y. et al., Synthesis Characterization and Exemplified Operation of Cathode Materials for Lithiumion Battery, Harbin Institute of Technology Press, 2021, with English translation. (10 pages); cited in CN Office Action dated Jun. 12, 2026.
Office Action dated Jun. 12, 2026, issued in counterpart CN Application No. 20211625221.4. (7 pages).

*Primary Examiner* — Kevin P Kerns
(74) *Attorney, Agent, or Firm* — WHDA, LLP

(57) ABSTRACT

An electrochemical apparatus, including an electrolyte and a positive electrode, where the electrolyte includes ethylene carbonate and propylene carbonate, the positive electrode includes a positive electrode current collector and a positive electrode active material layer disposed on at least one surface of the positive electrode current collector, and the positive electrode active material layer includes a positive electrode active material, where percentages of ethylene carbonate and propylene carbonate satisfy a specific relationship, and under an X-ray diffraction (XRD) test, a peak intensity $I_{003}$ of plane 003 of the positive electrode active material layer and a peak intensity $I_{104}$ of plane 104 of the positive electrode active material layer satisfy a specific relationship. With the above configuration, the electrochemical apparatus of this application shows excellent performances, especially the high-temperature floating charge performance.

14 Claims, No Drawings

ELECTROCHEMICAL APPARATUS AND ELECTRONIC APPARATUS INCLUDING SAME

CROSS REFERENCE TO RELATED APPLICATIONS

The present application claims the benefit of priority from the China Patent Application No. 202111625221.4, filed on 28 Dec. 2021, the disclosure of which is hereby incorporated by reference in its entirety.

TECHNICAL FIELD

This application relates to the field of energy storage technologies, and specifically, to an electrochemical apparatus and an electronic apparatus including the same.

BACKGROUND

With the popularization and application of intellectual products, demands for mobile phones, notebook computers, cameras, and other electronic products have increased year by year, and electrochemical apparatuses, as the power source of electronic products, are playing an increasingly important role in daily lives. Lithium-ion batteries are widely used in the field of consumer electronics by virtue of their advantages such as high specific energy, high working voltage, low self-discharge rate, small size, and light weight.

However, in addition to the service life of lithium-ion batteries to which people usually pay more attention, the safety performance of lithium-ion batteries under continuous charging or high-voltage conditions has also become a new focus. For example, people tend to continuously charge their electronic products when they are sleeping at night, or in an exhibition hall of technology products, electronic products need to be continuously charged under high voltage so as to meet the demands of consumers for using at any time. Continuous charging or high-voltage charging raises the temperature of lithium-ion batteries, which brings safety hazards.

In view of this, it is desirable to provide an electrochemical apparatus with improved high-temperature floating charge performance so as to meet use requirements.

SUMMARY

To resolve the foregoing problems, this application improves the high-temperature floating charge performance and high-temperature storage performance of an electrochemical apparatus through adjustment of compatibility between a solvent in an electrolyte and a positive electrode under the premise of ensuring efficient dissolution of a lithium salt, so as to enhance the tolerance of the electrochemical apparatus to extreme conditions.

According to a first aspect of this application, this application provides an electrochemical apparatus, which includes an electrolyte, where the electrolyte includes ethylene carbonate and propylene carbonate, and based on a total weight of the electrolyte, a percentage of the ethylene carbonate is x % and a percentage of the propylene carbonate is y %, where $0.14 \le x/y < 1$; and a positive electrode, where the positive electrode includes a positive electrode current collector and a positive electrode active material layer disposed on at least one surface of the positive electrode current collector, the positive electrode active material layer includes a positive electrode active material, and under an X-ray diffraction (XRD) test, a peak intensity of plane 003 of the positive electrode active material layer is $I_{003}$, a peak intensity of plane 104 of the positive electrode active material layer is $I_{104}$, and a ratio n of $I_{003}$ to $I_{104}$ satisfies $5 \le n \le 25$ and $0.25 \le x/n \le 4$.

According to the foregoing embodiment of this application, the percentages of the ethylene carbonate and the propylene carbonate satisfy $10 \le x+y \le 40$.

According to the foregoing embodiment of this application, the electrolyte further includes at least one of a dinitrile compound or a trinitrile compound.

According to the foregoing embodiment of this application, the dinitrile compound includes at least one of a first dinitrile compound or a second dinitrile compound, where the first dinitrile compound includes at least one of the following formula I-1 to formula I-7:

(formula I-1)

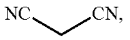

(formula I-2)

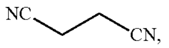

(formula I-3)

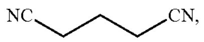

(formula I-4)

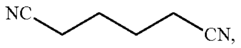

(formula I-5)

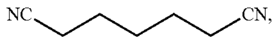

(formula I-6)

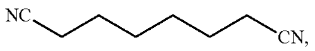 or (formula I-7)

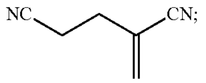 and the second dinitrile compound includes at least one of the following formula I-8 to formula I-12:

(formula I-8)

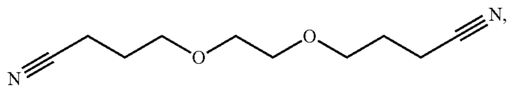

(formula I-9)

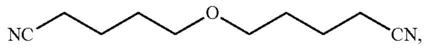

(formula I-10)

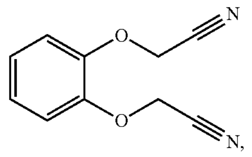

(formula I-11)

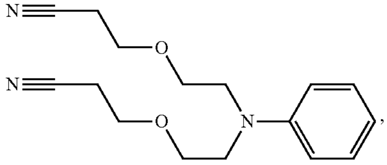 or (formula I-12)

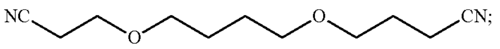 and the trinitrile compound includes at least one of a first trinitrile compound or a second trinitrile compound, where the first trinitrile compound includes at least one of the following formula II-1 to formula II-4:

(formula II-1)

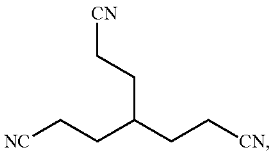

(formula II-2)

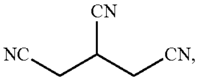

(formula II-3)

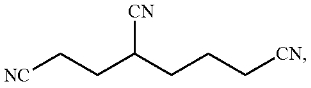

or (formula II-4)

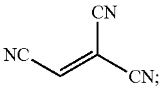

and the second trinitrile compound includes at least one of the compounds represented by the following formula II-5 or formula II-6:

(formula II-5)

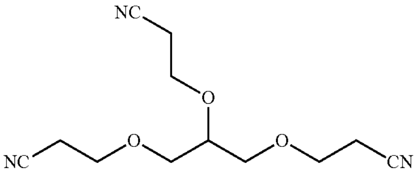

or (formula II-6)

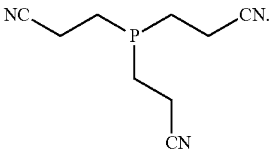

According to the foregoing embodiment of this application, based on the total weight of the electrolyte, a percentage of the dinitrile compound is a % and a percentage of the trinitrile compound is b %, where a/b≥1.

According to the foregoing embodiment of this application, the electrolyte includes the first dinitrile compound and the second dinitrile compound, and based on the total weight of the electrolyte, a percentage of the first dinitrile compound is a1% and a percentage of the second dinitrile compound is a2%, where a2/a1≤1.3.

According to the foregoing embodiment of this application, the electrolyte includes the first trinitrile compound and the second trinitrile compound, and based on the total weight of the electrolyte, a percentage of the first trinitrile compound is b1% and a percentage of the second trinitrile compound is b2%, where 0≤b1−b2≤5.

According to the foregoing embodiment of this application, the electrolyte further includes a sultone compound.

According to the foregoing embodiment of this application, the electrolyte further includes a sultone compound, and based on the total weight of the electrolyte, a percentage of the sultone compound is c %, where 0.05≤c/(a+b)≤1.

According to the foregoing embodiment of this application, the sultone compound includes at least one of the following formula III-1 to formula III-9:

(formula III-1)

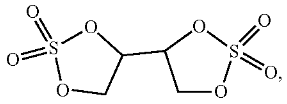

(formula III-2)

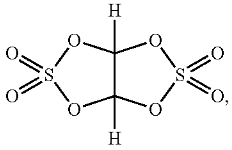

(formula III-3)

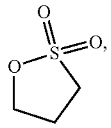

(formula III-4)

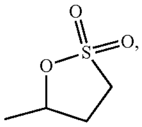

(formula III-5)

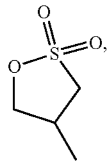

(formula III-6)

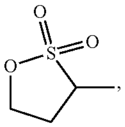

(formula III-7)

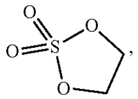

(formula III-8)

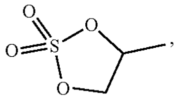

or (formula III-9)

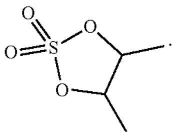

According to the foregoing embodiment of this application, the electrolyte further includes a boron-containing lithium salt, and the boron-containing lithium salt includes at least one of lithium oxalate borate, lithium difluorooxalate borate, lithium tetrafluoroborate, or lithium borate.

According to the foregoing embodiment of this application, based on the total weight of the electrolyte, a percentage of the boron-containing lithium salt is d %, where d/a≤0.5.

According to the foregoing embodiment of this application, the positive electrode active material contains element M, and the element M contains at least one of Zn, Ti, Al, W, Zr, Nb, Y, or Sb.

According to the foregoing embodiment of this application, the positive electrode active material contains a lithium cobalt oxide containing element M.

According to the foregoing embodiment of this application, in differential scanning calorimetry (DSC) analysis, the positive electrode active material layer has an exothermic peak between 240° C. and 270° C.

According to the foregoing embodiment of this application, a thickness of the positive electrode active material layer on one side of the positive electrode current collector ranges from 25 μm to 70 μm.

According to another aspect of this application, this application further provides an electronic apparatus, including the electrochemical apparatus according to the foregoing embodiments.

DESCRIPTION OF EMBODIMENTS

Embodiments of this application are described in detail below. The embodiments of this application should not be construed as a limitation on this application.

As in this application, the terms "include", "contain", and "comprise" are used in their inclusive and non-limiting meanings.

In addition, quantities, ratios, and other values are sometimes presented in the format of ranges in this specification. It should be understood that such range formats are used for convenience and simplicity and should be flexibly understood as including not only values clearly designated as falling within the range but also all individual values or sub-ranges covered by the range as if each value and sub-range are clearly designated.

In specific embodiments and claims, a list of items connected by the terms "one or more of", "one or more piece of", "one or more kind of" or other similar terms may mean any combination of the listed items. For example, if items A and B are listed, the phrase "at least one of A or B" means only A; only B; or A and B. In another example, if items A, B, and C are listed, the phrase "at least one of A, B, or C" means only A; only B; only C; A and B (exclusive of C); A and C (exclusive of B); B and C (exclusive of A); or all of A, B, and C. The item A may contain a single element or a plurality of elements. The item B may contain a single element or a plurality of elements. The item C may contain a single element or a plurality of elements.

This application provides an electrochemical apparatus, which includes an electrolyte and a positive electrode, where the electrolyte includes a solvent, and the positive electrode includes a positive electrode current collector and a positive electrode active material layer disposed on at least one surface of the positive electrode current collector, where the positive electrode active material layer includes a positive electrode active material.

The electrolyte of this application includes a solvent that contains a mixture of ethylene carbonate (EC) and propylene carbonate (PC). Compared with other solvents, propylene carbonate and ethylene carbonate have higher degrees of dissociation of a lithium salt, where propylene carbonate and ethylene carbonate greatly accelerate the dissolution of the lithium salt. Compared with propylene carbonate, ethylene carbonate has a much higher degree of dissociation of a lithium salt. However, ethylene carbonate is solid at room temperature, and this increases the viscosity of the electrolyte. Compared with ethylene carbonate, the liquid temperature range of propylene carbonate is much wider. Therefore, ethylene carbonate and propylene carbonate being used together in a specified proportion not only can increase the degree of dissociation of the lithium salt, but also can widen the liquid temperature range of the electrolyte, thereby improving the high-temperature floating charge performance of the electrochemical apparatus. In the electrolyte of this application, based on a total weight of the electrolyte, a percentage of the ethylene carbonate is x % and a percentage of the propylene carbonate is y %, where a relationship of percentages of the ethylene carbonate and the propylene carbonate satisfies $0.14 \leq x/y < 1$.

For the positive electrode, in the X-ray diffraction (XRD) test, the positive electrode active material layer has at least one peak at angle 2θ 18.9°±2° and one peak at angle 2θ 45.2°±2°. The peaks are peaks on plane 003 and plane 104 respectively, where the plane 003 is an inert plane with low reactivity with the electrolyte, and the plane 104 is an active plane with high reactivity with the electrolyte. An appropriately increase in a proportion of the plane 003 can effectively reduce side reactions between the positive electrode active material and the electrolyte, thereby improving the high-temperature floating charge performance of the electrochemical apparatus. Adjusting the compacted density of the positive electrode active material layer is one of the technical means to adjust the ratio of a peak intensity $I_{003}$ of the plane 003 to the peak intensity $I_{104}$ of the plane 104 of the positive electrode active material layer. When the ratio n of $I_{003}$ to $I_{104}$ of the positive electrode active material layer is excessively small (less than 5), a contact area between the positive electrode active material and the electrolyte increases significantly, and the reaction activity also increases, thereby affecting the high-temperature floating charge performance of the electrochemical apparatus. When the ratio n of $I_{003}$ to $I_{104}$ of the positive electrode active material layer is excessively large (greater than 25), the normal deintercalation of lithium ions out of the positive active material is affected, thereby resulting in a polarization increase. In addition, a larger compacted density of the positive electrode active material also leads to a fracture of particles of the positive electrode active material, causing the positive electrode active material to expose a larger active area, thereby affecting the high-temperature floating charge performance and high-temperature storage performance of the electrochemical apparatus. Therefore, in this application, the peak intensity is adjusted by adjusting the compacted density of the positive electrode active material, so that in the XRD test, the ratio n of the peak intensity $I_{003}$ of the plane 003 of the positive electrode active material layer to the peak intensity $I_{104}$ of the plane 104 of the positive electrode active material layer satisfies $5 \leq n \leq 25$.

In addition, to make compatibility between the electrolyte and the positive electrode better, in the electrochemical apparatus of this application, the percentage of the ethylene carbonate x % and n of the positive electrode active material layer satisfy $0.25 \leq x/n \leq 4$. This is because the reaction activity between ethylene carbonate and the plane 104 of the positive electrode active material layer is relatively large, and the reaction activity between ethylene carbonate and the plane 003 is relatively small. When the ratio of x to n, x/n, exceeds 4 due to the high percentage of ethylene carbonate, the probability of contact between ethylene carbonate and the plane 104 increases, thereby causing ethylene carbonate to decompose and produce gas, and thus affecting the high-temperature floating charge performance and high-temperature storage performance of the electrochemical apparatus. As the percentage of ethylene carbonate decreases, the probability of contact between the ethylene carbonate and the plane 104 greatly reduces, and the decomposition and gas production are improved to some extent. However, as an important solvent in the electrolyte, when the percentage of ethylene carbonate is relatively low to make the ratio of x to n, x/n, lower than 0.25, the dissolution of additives and the dissociation of the lithium salt are reduced, thereby decreasing the stability of the electrolyte and leading to local active lithium precipitation, and aggravating gas production.

By adjusting the percentages of ethylene carbonate and propylene carbonate in the electrolyte, the ratio n of $I_{003}$ to $I_{104}$ of the positive electrode active material layer, and the relationship between the percentage of ethylene carbonate and n, the electrochemical apparatus of this application has a significantly improved high-temperature floating charge performance and high-temperature storage performance.

In some embodiments, 0.30≤x/y≤0.9, and within this range, the high-temperature floating charge performance and high-temperature storage performance of the electrochemical apparatus can be further improved.

Adjusting the total percentage of the ethylene carbonate and the propylene carbonate in the electrolyte can further improve the electrochemical performance of the electrochemical apparatus, especially the high-temperature floating charge performance. In some embodiments, percentages of the ethylene carbonate and the propylene carbonate satisfy 10≤x+y≤40. When the percentages of the ethylene carbonate and the propylene carbonate are within the preceding range, the precipitation of additives and the lithium salt can be further reduced, active lithium precipitation is alleviated, and less side reactions of the electrochemical apparatus occur. In some embodiments, a sum of the percentages of the ethylene carbonate and the propylene carbonate in the electrolyte may be 10%, 15%, 20%, 25%, 30%, 35%, or 40%, or a range between any two of the above values.

In some embodiments, the electrolyte of this application further includes a nitrile additive. In some embodiments, the nitrile additive contains a cyano (—CN) functional group. The nitrile additive can form a protective film with excellent performance on the surface of the positive electrode, thereby well stabilizing the structure of the positive electrode active material, inhibiting the dissolution of active metals, and improving the stability of the electrochemical apparatus at high temperatures, especially high-temperature floating charge performance and safety performance.

In some embodiments, the electrolyte includes at least one of a dinitrile compound or a trinitrile compound. In some embodiments, the electrolyte includes a dinitrile compound and a trinitrile compound. Adding nitrile compounds can stabilize the active plane 104, reduce the degree of reaction between the positive active material and the electrolyte, and further improve the floating charge performance and high-temperature storage performance of the electrochemical apparatus when the ratio of $I_{003}/I_{004}$ is given. Reactions with the positive electrode active material vary with different spatial structures of dinitrile compounds and trinitrile compounds. By using the dinitrile compounds and trinitrile compounds in combination, it helps to form a composite protective layer at the positive electrode, and achieves a more effective protection effect on the positive electrode interface, thereby helping to improve the high-temperature floating charge performance and safety performance of the electrochemical apparatus.

In some embodiments, the dinitrile compound includes at least one of a first dinitrile compound or a second dinitrile compound, where the first dinitrile compound includes at least one of the compounds represented by the following formula I-1 to formula I-7:

(formula I-1)

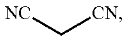

(formula I-2)

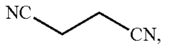

(formula I-3)

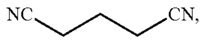

(formula I-4)

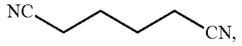

(formula I-5)

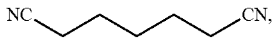

(formula I-6)

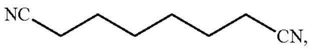

or (formula I-7)

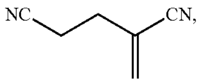

and the second dinitrile compound includes at least one of the following formula I-8 to formula I-12:

(formula I-8)

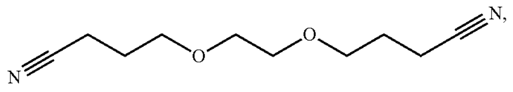

(formula I-9)

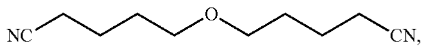

(formula I-10)

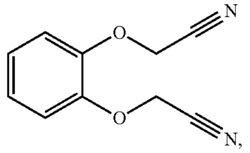

(formula I-11)

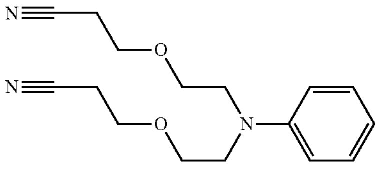

, or (formula I-12)

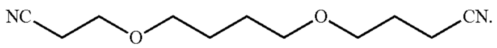

In some embodiments, the trinitrile compound includes at least one of a first trinitrile compound or a second trinitrile compound, where the first trinitrile compound includes at least one of the compounds represented by the following formula II-1 to formula II-4:

(formula II-1)

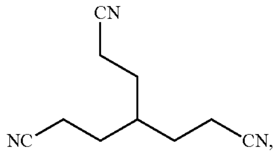

(formula II-2)

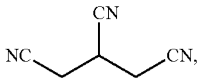

(formula II-3)

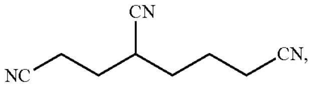

or (formula II-4)

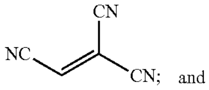

and the second trinitrile compound includes at least one of the compounds represented by the following formula II-5 or formula UU-6:

(formula II-5)

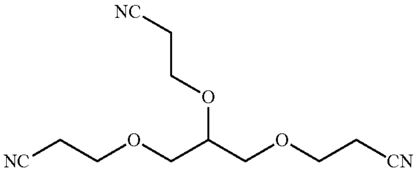

or (formula II-6)

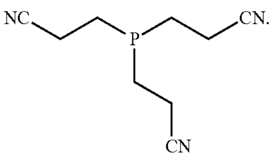

In some embodiments, based on the total weight of the electrolyte, a percentage of the nitrile additive is 0.01% to 15%, 0.01% to 10%, 0.1% to 15%, 0.1% to 10%, 2% to 8%, 1% to 15%, or 1% to 10%.

Adjusting the percentage relationship between the dinitrile compound and the trinitrile compound in the electrolyte can further improve the protective effect of the dinitrile compound and the trinitrile compound on the positive electrode interface, thereby improving the high-temperature floating charge performance of the electrochemical apparatus. The joint effect of the dinitrile compound and the trinitrile compound can reduce the influence of molecular steric hindrance, and can better stabilize the interface of the positive electrode active material. In some embodiments, based on the total weight of the electrolyte, a percentage of the dinitrile compound is a % and a percentage of the trinitrile compound is b %, where $a/b \geq 1$. In some embodiments, $a/b \geq 1.5$. In some embodiments, $a/b \geq 2$. In some embodiments, $a/b \geq 2.5$. In some embodiments, $a/b \geq 3$. In some embodiments, $a/b \leq 15$. In some embodiments, $a/b \leq 10$.

In some embodiments, based on the total weight of the electrolyte, the percentage of the dinitrile compound is less than or equal to 10%. For example, the percentage of the dinitrile compound in the electrolyte may be, but is not limited to, 1%, 2%, 3%, 5%, 6%, 8%, or 10%, or a range between any two of the above values. In some embodiments, the electrolyte includes both the first dinitrile compound and the second dinitrile compound, and based on the total weight of the electrolyte, a percentage of the first dinitrile compound is a1% and a percentage of the second dinitrile compound is a2%, where $a2/a1 < 1.3$. In some embodiments, $a2/a1 < 1$. In some embodiments, $a2/a1 < 0.8$. In some embodiments, $a2/a1 < 0.5$. The mass ratio of the first dinitrile compound to the second dinitrile compound being within the preceding ranges is conducive to improving the high-temperature floating charge performance and high-temperature storage performance of the electrochemical apparatus.

In some embodiments, based on the total weight of the electrolyte, the percentage of the trinitrile compound is less than or equal to 6%. For example, the percentage of the trinitrile compound in the electrolyte may be, but is not limited to, 1%, 2%, 3%, 5%, or 6%, or a range between any two of the above values.

In some embodiments, the electrolyte includes both the first trinitrile compound and the second trinitrile compound, and based on the total weight of the electrolyte, a percentage of the first trinitrile compound is b1% and a percentage of the second trinitrile compound is b2%, where $0 \leq b1-b2 \leq 5$. In some embodiments, $0.5 \leq b1-b2 \leq 4.5$. In some embodiments, $1 \leq b1-b2 \leq 4$. In some embodiments, $2 \leq b1-b2 \leq 3$. The mass ratio of the first trinitrile compound to the second trinitrile compound being within the preceding ranges is conducive to improving the high-temperature floating charge performance and high-temperature storage performance of the electrochemical apparatus.

In some embodiments, the electrolyte contains a sultone compound. During the charging and discharging process of the electrochemical apparatus, the sultone compound undergoes a ring-opening reaction to form a sulfur-rich organic and inorganic composite protective film on the surface of the positive electrode. The composite protective film has good tolerance to high temperatures, reduces the contact side reactions between the positive electrode active material and the electrolyte at high temperatures, and improves the high-temperature floating charge performance and high-temperature storage performance of the electrochemical apparatus.

In some embodiments, based on the total weight of the electrolyte, a percentage of the sultone compound is c %, where $0.001 \leq c \leq 5$. In some embodiments, $0.005 \leq c \leq 4.5$. In some embodiments, $0.01 \leq c \leq 4$. In some embodiments, $0.05 \leq c \leq 3.5$. In some embodiments, $0.1 \leq c \leq 3$. In some embodiments, $0.5 \leq c \leq 2.5$. In some embodiments, $1 \leq c \leq 2$. In some embodiments, a percentage of the sultone compound in the electrolyte is 0.001%, 0.005%, 0.01%, 0.05%, 0.1%, 0.5%, 1%, 2%, 3%, 4%, or 5%, or a range between any two of the above values. When the percentage of the sultone compound in the electrolyte is within the preceding ranges, an effective sulfur-rich protective film can be formed, which is conducive to improving the high-temperature floating charge performance and high-temperature storage performance of the electrochemical apparatus.

In some embodiments, the electrolyte includes all of the dinitrile compound, the trinitrile compound, and the sultone compound, where based on the total weight of the electrolyte, the percentages of the dinitrile compound, the trinitrile compound, and the sultone compound satisfy $0.05 \leq c/(a+b) \leq 1$. Both the sultone and the nitrile have excellent interfacial protection effects on the positive active material, but the sultone and the nitrile form some competitive effect. When the amount of sultone added is large, it may have a certain impact on the film formation of the nitrile. When the weight percentage of the sultone and the nitrile is within the preceding range, the effect of further enhancement can be achieved, and the effect of suppressing side reactions at the plane 104 of the positive electrode active material is also better. In some embodiments, 0.1≤c/(a+b)≤0.8. In some embodiments, 0.2≤c/(a+b)≤0.6. In some embodiments, 0.3≤c/(a+b)≤0.5. When the percentages of the dinitrile compound, the trinitrile compound and the sultone compound in the electrolyte satisfy the above relationship, it is helpful to further optimize the high-temperature floating charge charging performance of the electrochemical apparatus, and at the same time, it has the effect of improving the safety performance of the hot box.

In some embodiments, the sultone compound of this application includes, but is not limited to, at least one of the following formula III-1 to formula III-9:

(formula III-1)

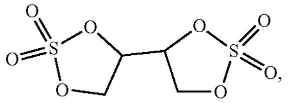

(formula III-2)

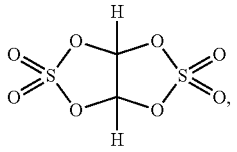

(formula III-3)

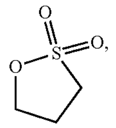

(formula III-4)

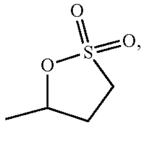

(formula III-5)

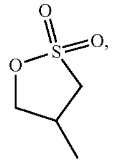

(formula III-6)

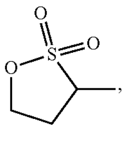

(formula III-7)

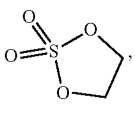

(formula III-8)

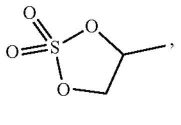

or

-continued (formula III-9)

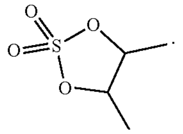

In some embodiments, the electrolyte includes a boron-containing lithium salt. During the charging and discharging process of the electrochemical apparatus, the plane 104 of the positive electrode active material layer has relatively high reactivity, and the dissolution of transition metals and the release of oxygen radicals usually occur. Adding boron-containing lithium salt may reduce the activity of oxygen radicals and reduce the catalytic oxidation of oxygen radicals to the electrolyte, thereby reducing accumulated by-products during the cycling process, and suppressing the growth of cycle impedance. In some embodiments of this application, the boron-containing lithium salt includes, but is not limited to, at least one of lithium oxalate borate, lithium difluorooxalate borate, lithium tetrafluoroborate, or lithium borate.

In some embodiments, based on the total weight of the electrolyte, a percentage of the boron-containing lithium salt is d %, where 0.01≤d<1. For example, the percentage of the boron-containing lithium salt in the electrolyte may be, but is not limited to, 0.03%, 0.04%, 0.07%, 0.08%, 0.1%, 0.2%, 0.3%, 0.4%, 0.5%, 0.6%, 0.8%, or 1, or a range between any two of the above values. The percentage of the boron-containing lithium salt in the electrolyte satisfying the preceding relationship is conducive to further improving the high-temperature floating charge performance and high-temperature cyclic performance of the electrochemical apparatus.

In some embodiments, the electrolyte includes both the dinitrile compound and boron-containing lithium salt, where based on the total weight of the electrolyte, the percentages of the boron-containing lithium salt and dinitrile compound satisfy d/a≤0.5. The boron-containing lithium salt improves the stability of a negative electrode protective film, and thus improves the stability of the electrolyte at a negative electrode interface. In addition, the boron-containing salt also participates in forming the film on the positive electrode so as to reduce side reactions at a positive electrode interface. When the mass ratio of the boron-containing lithium salt to the dinitrile compound is within the preceding range, the boron-containing lithium salt can form a protective film on the negative electrode before the dinitrile compound reacts with the negative electrode, which effectively reduces the instability of the dinitrile compound in forming a film on the negative electrode. In addition, the mass ratio of the boron-containing lithium salt to the dinitrile compound being within the preceding range reduces the probability of side reactions at the positive electrode interface during the cycling process, and the boron-containing lithium salt interacts with the nitrile to form a more effective positive electrode protective interface, thereby improving the overall performance of the electrochemical apparatus. In some embodiments, d/a≤0.4. In some embodiments, d/a≤0.3. In some embodiments, d/a≤0.2. In some embodiments, d/a≤0.1. The percentages of the dinitrile compound and the boron-containing lithium salt in the electrolyte satisfying the preceding relationships helps further optimize the high-temperature cycling resistance growth performance of the electrochemical apparatus while without affecting the high-temperature floating charge performance of the electrochemical apparatus.

The positive electrode active material of this application includes a compound that can reversibly intercalate and deintercalate lithium ions.

In some embodiments, the positive electrode active material contains element M, where the element M contains at least one of zinc (Zn), titanium (Ti), aluminum (Al), tungsten (W), zirconium (Zr), niobium (Nb), yttrium (Y), or stibium (Sb). A mass percentage of the element M in the positive electrode active material ranges from 0.01% to 1.2%.

In some embodiments, the positive active material further includes at least one of magnesium (Mg), boron (B), vanadium (V), chromium (Cr), iron (Fe), copper (Cu), molybdenum (Mo), tin (Sn), calcium (Ca), strontium (Sr), or lanthanum (La).

In some embodiments, the positive electrode active material further includes other trace elements, such as at least one of fluorine (F), phosphorus (P), or sulfur (S).

In some embodiments, the positive electrode active material may include, but is not limited to, at least one of lithium cobalt oxide, lithium iron phosphate, lithium iron manganese phosphate, lithium manganese oxide, lithium nickel oxide, lithium nickel cobalt manganese oxide, lithium-rich manganese-based materials, and lithium nickel cobalt aluminum oxide. In addition, a plurality of the preceding compounds may be used in combination as the positive electrode active material.

In some embodiments, the positive electrode active material layer further includes a binder. The binder enhances binding between particles of the positive electrode active material, and binding between the positive electrode active material and the current collector. Non-limiting examples of the binder include polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-difluoroethylene), polyethylene, polypropylene, styrene-butadiene rubber, acrylic styrene-butadiene rubber, epoxy resin, nylon, and the like.

In some embodiments, the positive electrode active material layer optionally further includes a conductive material, so as to further improve conductivity of the positive electrode active material layer. Non-limiting examples of the conductive material include a carbon-based material (for example, natural graphite, artificial graphite, carbon black, acetylene black, KETJEN BLACK (highly conductive carbon black), and carbon fiber), a metal-based material (for example, metal powder, and metal fiber, including copper, nickel, aluminum, silver, and the like), a conductive polymer (for example, a polyphenylene derivative), and any mixture thereof.

The positive electrode current collector may be a positive electrode current collector commonly used in the art. In some embodiments, the positive electrode current collector includes, but is not limited to, aluminum foil or nickel foil.

In this application, differential thermal scanning analysis (DSC) is further used to characterize the thermal stability of the positive electrode active material layer. In some embodiments, the positive electrode in this application has an exothermic peak between 240° C. and 270° C. A higher temperature at which the exothermic peak appears indicates a better thermal stability of the positive electrode active material layer, and therefore is more conducive to improving the high-temperature floating charge performance and safety performance of the electrochemical apparatus. The temperature at which the exothermic peak of the positive electrode active material layer appears is related to various factors, for example, a metal element contained in the positive electrode active material, and the size of the positive electrode active material particles. For example, reducing the proportion of small and medium particles in the positive electrode active material can increase the temperature at which the exothermic peak of the positive electrode active material appears. For another example, when the positive electrode active material contains the element aluminum, increasing a percentage of the aluminum can also increase the temperature at which the exothermic peak of the positive electrode active material appears.

In some embodiments, a thickness of the positive electrode active material layer on one side of the positive electrode current collector ranges from 25 μm to 70 μm. In some embodiments, a thickness of the positive electrode active material layer on one side of the positive electrode current collector ranges from 30 μm to 60 μm. In some embodiments, a thickness of the positive electrode active material layer on one side of the positive electrode current collector ranges from 40 μm to 50 μm. The thickness of the positive electrode active material layer on one side of the positive electrode current collector being within the preceding ranges is conducive to transport of lithium ions, thereby helping improve energy density of the electrochemical apparatus.

In some embodiments, the electrolyte of this application further includes a lithium salt, where the lithium salt includes, but is not limited to, at least one of the following: lithium hexafluorophosphate ($LiPF_6$), lithium bistrifluoromethanesulfonimide ($LiN(CF_3SO_2)_2$) (LiTFSI for short), or lithium bis(fluorosulfonyl)imide $Li(N(SO_2F)_2)$ (LiFSI for short).

In some embodiments, based on the total weight of the electrolyte, a weight percentage of the lithium salt ranges from 6% to 20%. In some embodiments, based on the total weight of the electrolyte, a weight percentage of the lithium salt ranges from 8% to 15%. AQUION ion chromatography is used for the lithium salt with reference to General rules for ion chromatography JY/T 020-1996. Agilent 7890B is used for other components with reference to GB/T 9722-2006 Chemical reagent—General rules for the gas chromatography.

In some embodiments, the electrolyte further includes a cyclic ether. In some embodiments, the cyclic ether includes, but is not limited to, at least one of the following: tetrahydrofuran, 2-methyltetrahydrofuran, 1,3-dioxolane, 2-methyl 1,3-dioxolane, 4-methyl 1,3-dioxolane, 1,3-dioxane, 1,4-dioxane, or dimethoxypropane.

In some embodiments, based on the total weight of the electrolyte, a percentage of the cyclic ether ranges from 0.1% to 5%. In some embodiments, based on the total weight of the electrolyte, the percentage of the cyclic ether ranges from 0.5% to 5%, or 2% to 5%.

In some embodiments, the electrolyte further includes a chain ether. In some embodiments, the chain ether includes, but is not limited to, at least one of the following: dimethoxymethane, 1,1-dimethoxyethane, 1,2-dimethoxyethane, diethoxymethane, 1,1-diethoxyethane, 1,2-diethoxyethane, ethoxymethoxymethane, 1,1-ethoxymethoxyethane, or 1,2-ethoxymethoxyethane.

In some embodiments, based on the total weight of the electrolyte, a percentage of the chain ether ranges from 0.1% to 10%. In some embodiments, based on the total weight of the electrolyte, a percentage of the chain ether ranges from 0.5% to 10%, 2% to 10%, or 3% to 10%.

In some embodiments, the electrochemical apparatus of this application further includes a negative electrode, where the negative electrode includes a negative electrode current collector and a negative electrode active material layer disposed on at least one surface of the negative electrode current collector, and the negative electrode active material layer includes a negative electrode active material.

The negative electrode active material of this application includes any material capable of reversibly intercalating and deintercalating lithium ions. The specific types of the negative electrode active material are not subject to specific restrictions, and can be selected according to requirements. In some embodiments, the negative electrode active material may include or is selected from one or more of the following materials: a carbonaceous material, a siliceous material, an alloy material, or a lithium-containing metal composite oxide material. In some embodiments, the carbonaceous material may include, but is not limited to, crystalline carbon, amorphous carbon, and combinations thereof. The crystalline carbon may be amorphous, plate-shaped, flake-shaped, spherical or fiber-shaped natural graphite or artificial graphite. The amorphous carbon may be soft carbon, hard carbon, a mesophase pitch carbonization product, burnt coke, or the like.

In some embodiments, the negative electrode active material may include, but is not limited to, at least one of natural graphite, artificial graphite, mesocarbon microbeads (MCMB for short), hard carbon, silicon, a silicon-carbon composite, or silicon oxide.

The negative electrode current collector may be a negative electrode current collector commonly used in the art. In some embodiments, the negative electrode current collector includes, but is not limited to, copper foil, nickel foil, stainless steel foil, titanium foil, foamed nickel, foamed copper, a polymer base coated with conductive metal, and a combination thereof.

In some embodiments, the negative electrode active material layer may further include a binder and/or a conductive agent. The binder and the conductive agent may be the foregoing materials disclosed in the positive electrode, which are not be repeated herein.

In some embodiments, the electrochemical apparatus of this application further includes a separator disposed between the positive electrode and the negative electrode so as to prevent short circuits. The separator used in the electrochemical apparatus according to this application is not particularly limited to any material or shape, and may be based on any technology disclosed in the prior art. In some embodiments, the separator includes a polymer or an inorganic substance formed by a material stable to the electrolyte of this application.

In some embodiments, the separator may include a substrate layer and a surface treatment layer. The base material layer is a non-woven fabric, membrane, or composite membrane having a porous structure, and a material of the base material layer is selected from at least one of polyethylene, polypropylene, polyethylene terephthalate, or polyimide. Specifically, a polypropylene porous membrane, a polyethylene porous membrane, a polypropylene non-woven fabric, a polyethylene non-woven fabric, or a polypropylene-polyethylene-polypropylene porous composite membrane may be selected.

In some embodiments, at least one surface of the substrate layer is provided with a surface treatment layer, and the surface treatment layer may be a polymer layer or an inorganic substance layer, or a layer formed by mixing a polymer and an inorganic substance.

The inorganic layer includes inorganic particles and a binder. The inorganic particles are selected from one or a combination of aluminum oxide, silicon oxide, magnesium oxide, titanium oxide, hafnium oxide, tin oxide, ceria oxide, nickel oxide, zinc oxide, calcium oxide, zirconium oxide, yttrium oxide, silicon carbide, boehmite, aluminum hydroxide, magnesium hydroxide, calcium hydroxide, and barium sulfate. The binder is selected from one or a combination of polyvinylidene fluoride, a vinylidene fluoride-hexafluoropropylene copolymer, polyamide, polyacrylonitrile, polyacrylate, polyacrylic acid, polyacrylate, polyvinylpyrrolidone, polyvinyl ether, polymethyl methacrylate, polytetrafluoroethylene, and polyhexafluoropropylene.

The polymer layer includes a polymer, and a material of the polymer is selected from at least one of polyamide, polyacrylonitrile, an acrylate polymer, polyacrylic acid, polyacrylate, polyvinylpyrrolidone, polyvinyl ether, polyvinylidene fluoride, or poly(vinylidene fluoride-hexafluoropropylene).

A person skilled in the art should understand that the electrochemical apparatus of this application may be a lithium-ion battery, or may be any other suitable electrochemical apparatuses. Without departing from the content disclosed in this application, the electrochemical apparatus according to an embodiment of this application may include any apparatus in which an electrochemical reaction takes place. Specific examples of the electrochemical apparatus include primary batteries or secondary batteries. Specifically, the electrochemical apparatus is a lithium secondary battery.

The electrochemical apparatus of this application is not particularly limited to any purpose, and may be used for any known purposes in the prior art. According to some embodiments of this application, the electrochemical apparatus of this application may be used for an electronic apparatus, and the electronic apparatus includes, but is not limited to, notebook computers, pen-input computers, mobile computers, electronic book players, portable telephones, portable fax machines, portable copiers, portable printers, stereo headsets, video recorders, liquid crystal display televisions, portable cleaners, portable CD players, mini-disc players, transceivers, electronic notebooks, calculators, storage cards, portable recorders, radios, backup power sources, motors, automobiles, motorcycles, motor bicycles, bicycles, lighting appliances, toys, game machines, clocks, electric tools, flash lamps, cameras, large household batteries, and the like.

The technical solutions of this application will be further described below with reference to the comparative examples and specific examples, but are not limited thereto. A person skilled in the art should understand that a preparation method described in this application is only an example embodiment, and all modifications or equivalent replacements to the technical solutions of this application, without departing from the spirit and scope of the technical solutions of this application, are within the scope of this application.

EXAMPLES

The following describes preparation methods and performance test methods of lithium-ion batteries in the examples and comparative examples of this application.

I. Preparation of Lithium-Ion Battery (1) Preparation of an electrolyte: In an argon atmosphere glove box with a water content less than 10 ppm, ethylene carbonate (EC), diethyl carbonate (DEC), and propylene carbonate (PC) were well mixed at a specific mass ratio, and then fully dried lithium salt $LiPF_6$ was dissolved in the foregoing non-aqueous solvent, and then fluoroethylene carbonate was added to form a basic electrolyte. Based on settings in the following examples and comparative examples, different amounts of additives were added to the basic electrolyte to obtain the electrolyte. Based on the total weight of the electrolyte, percentages of EC, PC and other additives are shown in Table 1 to Table 6. The percentage of $LiPF_6$ is 12%, the percentage of fluoroethylene carbonate is 5%, and the rest is DEC.

(2) Preparation of a positive electrode: A positive electrode active material lithium cobalt oxide ($LiCoO_2$), a conductive agent acetylene black and a binder polyvinylidene fluoride (PVDF) were fully stirred and mixed in an appropriate amount of N-methylpyrrolidone (NMP) solvent at a weight ratio of 96:2:2, to form a uniform positive electrode slurry; and the positive electrode slurry was applied onto a positive electrode current collector aluminum foil, followed by drying and cold pressing, to obtain a positive electrode active material layer, and further, cutting was performed and tabs were welded to obtain the positive electrode (also called a positive electrode plate).

(3) Preparation of a negative electrode: a negative active material graphite, a binder styrene-butadiene rubber (SBR), and a thickener sodium carboxymethyl cellulose (CMC) were fully stirred and mixed in an appropriate amount of deionized water at a weight ratio of 96:2:2, to form a uniform negative electrode slurry; and the negative electrode slurry was applied onto a negative electrode current collector copper foil, followed by drying and cold pressing, to obtain a negative electrode active substance layer, and further cutting was performed and tabs were welded to obtain a negative electrode (also called a negative electrode plate).

(4) Preparation of a separator: A polyethylene (PE) porous polymer film was used as a separator.

(5) Preparation of a lithium-ion battery: The positive electrode, the separator, and the negative electrode were stacked in order, so that the separator was sandwiched between the positive electrode and the negative electrode for separation, and then the stack was wound and placed in an outer packaging foil. The foregoing prepared electrolyte was injected, followed by processes such as vacuum packaging, standing, formation, and shaping, to obtain a lithium-ion battery.

II. Positive Electrode Test Methods and Lithium-Ion Battery Performance Test Methods (1). XRD Test for a Positive Electrode Active Material Layer The lithium-ion battery was discharged to a voltage of 3.0 V, a positive electrode plate was disassembled, and an area 25 mm×30 mm of electrode plate was taken from the middle area of the positive electrode plate. In a dry environment, the electrode plate was stuck to one end of a clean glass slide by using double-sided tape, and flattened on a piece of clean dust-free paper so as to keep the electrode plate flat. An X'pert PRO device using a Cu target was used to perform the test. There were one peak at an angle 2θ 18.9°±2° and one peak at an angle 2θ 45.2°±2°, which were the peaks of a plane 003 and a plane 104 respectively. Peak intensities of the two peaks were calculated to obtain the peak intensity $I_{003}$ of the plane 003 and the peak intensity $I_{104}$ of the plane 104 of the positive electrode active material layer.

(2). Differential Scanning Calorimetry Analysis (DSC) of a Positive Electrode

At 25° C., the lithium-ion battery was charged to a 100% state of charge (SOC) at a current of 0.5 C. The lithium-ion battery was discharged to obtain a lithium-ion battery with a voltage of 3.0 V, and then disassembled. A positive electrode plate of an area≥30 cm$^2$ was taken out. The positive electrode plate was put into a beaker and high-purity dimethyl carbonate (DMC) was poured into the breaker so that the electrode plate was completely immersed in the liquid. The beaker was sealed with plastic wrap or sealing film. The DMC was replaced after every 6 hours of immersion, and the replacement was performed 3 times. The soaked positive electrode plate was first drained, and then transferred to a transition compartment of a glove box to be naturally air dried. The processed electrode plate was punched by using a punching machine with a diameter of 4 nm to obtain a circular plate. The punched sample was placed flat at the bottom of a crucible by using tweezers, and properly sealed with a clamp. A test was performed using the differential scanning calorimetry (DSC) method in which the temperature was raised to 450° C. from a room temperature at a temperature rise rate of 5° C./min.

(3). High-Temperature Floating Charge Performance Test

At a temperature of 45° C., the lithium-ion battery was discharged to 3.0 V at a current of 0.5 C, and left standing for 5 minutes. Then the lithium-ion battery was charged to 4.45 V at the current of 0.5 C, and charged to 0.05 C (the battery was fully charged) at a constant voltage of 4.45 V. A PPG soft-pack battery thickness gauge was used to measure, under a pressure of 700 g, a thickness of the fully-charged lithium-ion battery, where the thickness was recorded as H1. The lithium-ion battery was then placed in an oven at 45° C. to be charged at a constant voltage of 4.45 V for 500 hours, followed by measuring the thickness of the lithium-ion battery, where the thickness was recorded as H2. A high-temperature floating charge thickness swelling rate of the lithium-ion battery was calculated according to the following formula: (H2−H1)/H1×100%.

(4) High-Temperature Storage Performance Test

The lithium-ion battery was discharged to 3.0 V at 0.5 C at 25° C., and left standing for 5 minutes. Then the lithium-ion battery was charged to 4.45 V at 0.5 C, and charged to 0.05 C at a constant voltage of 4.45 V. A PPG soft-pack battery thickness gauge was used to measure a thickness of the fully-charged lithium-ion battery, where the thickness was recorded as H3. The lithium-ion battery was placed in an oven at 70° C. to be stored for 72 hours. A thickness of the lithium-ion battery measured after 72 hours of storage was measured and recorded as H4. A high-temperature storage thickness swelling rate of the lithium-ion battery was calculated according to the following formula: (H4−H3)/H33×1000%.

(5) Hot-Box Test

The lithium-ion battery was discharged to 3.0 V at a current of 0.5 C, and left standing for 5 minutes. Then the lithium-ion battery was charged to 4.45V at the current of 0.5 C, and charged to 0.05 C (the battery was fully charged) at a constant voltage of 4.45 V. The fully-charged lithium-ion battery was placed in a hot box for 60 minutes at a constant temperature of 135° C. The lithium-ion battery passes the test if neither fire nor explosion occurs. 10 samples were tested for each example or comparative example. The test is successful if neither fire nor explosion occurs, and the test pass rate was recorded.

(6) Cycling DCIR Test

The lithium-ion battery was discharged to 3.0 V at a current of 0.5 C at 45° C., and left standing for 5 minutes. Then the battery was charged to 4.45 V at the current of 0.5 C, and charged to 0.05 C at a constant voltage of 4.45V. After charging, the battery was discharged to 3.0 V at the current of 0.5 C. This was one cycle. According to this charging and discharging process, the battery was charged and discharged for 400 cycles at 45° C.

The lithium-ion battery after 400 cycles was stored for 2 hours at a constant temperature of 25° C. Then the battery was discharged to 3.0 V at the current of 0.5 C, and left standing for 5 minutes. Then the battery was charged to 4.45 V at the current of 0.5 C, charged to 0.025 C at a constant voltage of 4.45 V, and left standing for 5 minutes. Then the battery was discharged to 3.4 V at a current of 0.1 C, and the discharged capacity of the battery is recorded as C1.

The lithium-ion battery was charged to 4.45 V at a capacity of 0.5 C1, charged to 0.025 C1 at a constant voltage of 4.45 V, and left standing for 5 minutes. Then the battery was discharged for 5 hours at 0.1 C1, where a voltage of the lithium-ion battery was recorded as V1. And then the battery was discharged for 1 second at a current of 1 C, where a voltage at the end of the discharge was recorded as V2. The high-temperature cycling impedance of the lithium-ion battery at a 50% state of charge (SOC) was calculated according to the following formula: (V1−V2)/(1 C−0.1 C1).

(7) High Rate Discharge Test

At 25° C., the lithium-ion battery was discharged to 3.0 V at a current of 0.5 C, and left standing for 5 minutes. Then the battery was charged to 4.45 V at the current of 0.5 C, and charged to 0.05 C at a constant voltage of 4.45 V. At 25° C., the battery was discharged to 3.0 V at the current of 0.5 C, where the discharged capacity of the battery was recorded as C1.

At 25° C., the battery was charged to 4.45 V at the current of 0.5 C, and charged to 0.05 C at a constant voltage of 4.45 V. At 25° C., the battery was discharged to 3.0 V at a current of 2 C. where the discharged capacity of the battery was recorded as C2.

The 2 C-rate discharge performance of the battery is measured by calculating the discharge percentage of the lithium-ion battery at 25° C. according to the following formula: (C2/C1)×100%.

III. Test Results

Table 1

The lithium-ion batteries of Examples 1.1 to 1.28 and Comparative Examples 1-4 in Table 1 were prepared according to the foregoing preparation methods. The electrochemical test results of the lithium-ion batteries are shown in Table 1, where a percentage of each of the components in the electrolyte is a mass percentage of this component based on a total weight of the electrolyte.

The results show that in the electrochemical apparatus, when $0.14 \leq x/y < 1$, $5 \leq n \leq 25$, and $0.25 \leq x/n \leq 4$ are all satisfied, the high-temperature floating charge performance and high-temperature storage performance of the electrochemical apparatus can be significantly improved.

To be specific, through comparison between Example 1.4 and Comparative Example 1, it can be learned that when the value of x/y is less than 1, the high-temperature floating charge performance and high-temperature storage performance of the lithium-ion battery are significantly improved. This is because that percentages of propylene carbonate and ethylene carbonate are within an appropriate range, which is conducive to improving dissociation of the lithium salt and increasing a liquid temperature range and viscosity of the electrolyte.

Through comparison between Example 1.4 and Comparative Example 2 and comparison between Example 1.24 and Comparative Example 4, it can be seen that when n is within an appropriate range ($5 \leq n \leq 25$), the high-temperature floating charge performance and high-temperature storage performance of the battery are significantly improved. This is because controlling contact between the highly reactive plane 104 with the electrolyte reduces side reactions of the battery.

Table 2

Examples 2.1 to 2.20 in Table 2 are improvements made on the basis of Example 1.24. To be specific, in Examples 2.1 to 2.20, nitrile compounds were further added to the electrolyte in Example 1.24, where the specific components and percentages thereof added and the performance test results of the lithium-ion batteries obtained are shown in Table 2.

The results show that adding the nitrile compounds to the electrolyte can further improve the high-temperature floating charge performance and high-temperature storage performance of the batteries.

Further, when the electrolyte contains both the dinitrile compound and the trinitrile compound, where a mass ratio of the dinitrile compound to the trinitrile compound satisfies $a/b \geq 1$, the high-temperature floating charge performance and high-temperature storage performance of the batteries can be further improved.

In addition, when the electrolyte contains two types of dinitrile compounds, where a mass ratio between the two types of dinitrile compounds satisfies $a2/a1 < 1.3$, the high-temperature floating charge performance and high-temperature storage performance of the battery can be further improved.

Table 3

Examples 3.1 to 3.13 in Table 3 are improvements made on the basis of Example 2.9, that is, a sultone compound was further added into the electrolyte, where the specific components and percentages thereof added and the performance test results of the lithium-ion batteries obtained are shown in Table 3.

The results show that adding the sultone compound into the electrolyte can further improve the high-temperature floating charge performance and hot-box performance of the lithium-ion batteries.

In addition, when the electrochemical apparatus further satisfies $0.05 \leq c/(a+b) \leq 1$, the high-temperature floating charge performance and hot box performance of the lithium-ion battery can be further optimized.

Examples 3.14 to 3.17 are improvements made on the basis of Example 1.24, that is, further adding a sultone compound to the electrolyte can further improve the high-temperature floating charge performance of the battery.

Table 4

Examples 4.1 to 4.19 in Table 4 are improvements made on the basis of Example 2.9, and Examples 4.20 and 4.21 are improvements made on the basis of Example 3.3, that is, a boron-containing lithium salt was further added into the electrolyte, where the specific components and percentages thereof added and the performance test results of the lithium-ion batteries obtained are shown in Table 4.

The results show that after the boron-containing lithium salt is added into the electrolyte, the high-temperature cycling resistance performance of the lithium-ion batteries can be significantly improved, while maintaining good high-temperature floating charge performance.

Table 5

Examples 5.1 to 5.8 in Table 5 show the effect of the temperature of the exothermic peak of the positive electrode active material layer on the battery performance in the DSC test. The results show that through a proper increase in the temperature of the exothermic peak of the positive active material layer in the DSC test, both the high-temperature floating charge performance and the hot-box performance of the battery are significantly improved.

Table 6

Examples 6.1 to 6.8 in Table 6 show the effect of a coating thickness of the positive electrode active material layer on one side of the positive electrode current collector on the performance of the lithium-ion battery. The results show that as the coating thickness of the positive active material layer on one side of the positive electrode current collector decreases, the high-rate discharge performance of the lithium-ion battery gets increasingly better.

In this specification, reference to "an embodiment", "some embodiments", "one embodiment", "another example", "an example", "a specific example", or "some examples" means that at least one embodiment or example in this application includes a specific feature, structure, material, or characteristic described in this embodiment or example. Therefore, descriptions in various places throughout this specification, such as "in some embodiments", "in the embodiments", "in an embodiment", "in another example", "in an example", "in a specific example", or "examples" do not necessarily refer to the same embodiment or example in this application. In addition, a specific feature, structure, material, or characteristic herein may be combined in any appropriate manner in one or more embodiments or examples.

Although illustrative embodiments have been demonstrated and described, a person skilled in the art should understand that the foregoing embodiments are not to be construed as limiting this application, and that the embodiments may be changed, replaced, and modified without departing from the spirit, principle, and scope of this application.

TABLE 1

| Example | Carbonate content EC content x | PC content y | x/y | x + y | Positive electrode $I_{003}/I_{104}$ n | x/n | High-temperature floating charge thickness swelling rate | High-temperature storage thickness swelling rate |
|---|---|---|---|---|---|---|---|---|
| Example 1.1 | 18 | 22 | 0.82 | 40 | 10 | 1.80 | 8.5% | 7.5% |
| Example 1.2 | 15 | 25 | 0.60 | 40 | 10 | 1.50 | 8.0% | 7.2% |
| Example 1.3 | 13 | 27 | 0.48 | 40 | 10 | 1.30 | 7.5% | 6.3% |
| Example 1.4 | 8 | 24 | 0.33 | 32 | 10 | 0.80 | 6.0% | 4.9% |
| Example 1.5 | 17 | 18 | 0.94 | 35 | 10 | 1.70 | 8.6% | 7.5% |
| Example 1.6 | 15 | 20 | 0.75 | 35 | 10 | 1.50 | 8.1% | 7.0% |
| Example 1.7 | 10 | 25 | 0.40 | 35 | 10 | 1.00 | 6.0% | 4.9% |
| Example 1.8 | 9 | 26 | 0.35 | 35 | 10 | 0.90 | 6.0% | 5.0% |
| Example 1.9 | 13 | 17 | 0.76 | 30 | 10 | 1.30 | 6.3% | 5.2% |
| Example 1.10 | 10 | 20 | 0.50 | 30 | 10 | 1.00 | 6.0% | 4.9% |
| Example 1.11 | 12 | 13 | 0.92 | 25 | 10 | 1.20 | 6.8% | 5.5% |
| Example 1.12 | 10 | 15 | 0.67 | 25 | 10 | 1.00 | 6.2% | 5.1% |
| Example 1.13 | 7 | 18 | 0.39 | 25 | 10 | 0.70 | 6.0% | 5.0% |
| Example 1.14 | 8 | 15 | 0.53 | 23 | 10 | 0.8 | 5.9% | 5.0% |
| Example 1.15 | 9 | 11 | 0.82 | 20 | 10 | 0.90 | 6.1% | 5.1% |
| Example 1.16 | 7 | 13 | 0.54 | 20 | 10 | 0.70 | 6.1% | 4.9% |
| Example 1.17 | 5 | 15 | 0.33 | 20 | 10 | 0.50 | 6.3% | 5.0% |
| Example 1.18 | 7 | 8 | 0.88 | 15 | 10 | 0.70 | 6.4% | 5.0% |
| Example 1.19 | 5 | 10 | 0.50 | 15 | 10 | 0.50 | 6.7% | 4.9% |
| Example 1.20 | 4 | 6 | 0.67 | 10 | 10 | 0.40 | 9.2% | 8.9% |
| Example 1.21 | 8 | 24 | 0.33 | 32 | 5 | 1.60 | 9.0% | 8.0% |
| Example 1.22 | 8 | 24 | 0.33 | 32 | 6 | 1.33 | 8.8% | 7.9% |
| Example 1.23 | 8 | 24 | 0.33 | 32 | 8 | 1.00 | 8.6% | 7.7% |
| Example 1.24 | 12 | 18 | 0.67 | 30 | 15 | 0.80 | 5.8% | 4.9% |
| Example 1.25 | 8 | 24 | 0.33 | 32 | 20 | 0.40 | 6.1% | 5.0% |
| Example 1.26 | 12 | 18 | 0.67 | 30 | 25 | 0.48 | 6.2% | 4.8% |
| Example 1.27 | 5 | 35 | 0.143 | 40 | 10 | 0.50 | 6.9% | 5.6% |
| Example 1.28 | 8 | 32 | 0.25 | 40 | 10 | 0.80 | 6.5% | 5.3% |
| Comparative Example 1 | 24 | 8 | 3.00 | 32 | 10 | 2.40 | 27.0% | 27.0% |
| Comparative Example 2 | 17 | 18 | 0.94 | 35 | 4 | 4.25 | 14.5% | 16.0% |
| Comparative Example 3 | 3 | 10 | 0.30 | 13 | 20 | 0.15 | 15.0% | 15.0% |
| Comparative Example 5 | 12 | 18 | 0.67 | 30 | 30 | 0.40 | 30.0% | 29.0% |

TABLE 2

| Example | Carbonate EC content x | Carbonate PC content y | x/y | x + y | Positive electrode $I_{003}/I_{104}$ n | x/n | Dinitrile Formula I-2 (%) | Dinitrile Formula I-4 (%) | Dinitrile Formula I-8 (%) | Trinitrile Formula II-3 (%) | Trinitrile Formula II-5 (%) | a/b | a2/a1 | b1-b2 | High-temperature floating charge thickness swelling rate | High-temperature storage thickness swelling rate |
|---|---|---|---|---|---|---|---|---|---|---|---|---|---|---|---|---|
| Example 1.24 | 12 | 18 | 0.67 | 30 | 15 | 0.80 | — | — | — | — | — | — | — | — | 5.8% | 4.9% |
| Example 2.1 | 12 | 18 | 0.67 | 30 | 15 | 0.80 | 3 | — | 0.5 | 2 | — | 1.75 | 0.17 | 2.0 | 3.4% | 2.3% |
| Example 2.2 | 12 | 18 | 0.67 | 30 | 15 | 0.80 | 3 | — | 1 | 2 | — | 2 | 0.33 | 2.0 | 3.3% | 2.2% |
| Example 2.3 | 12 | 18 | 0.67 | 30 | 15 | 0.80 | 3 | — | 1.5 | 2 | — | 2.25 | 0.5 | 2.0 | 3.2% | 2.1% |
| Example 2.4 | 12 | 18 | 0.67 | 30 | 15 | 0.80 | 3 | — | 2 | 2 | — | 2.5 | 0.67 | 2.0 | 3.1% | 2.2% |
| Example 2.5 | 12 | 18 | 0.67 | 30 | 15 | 0.80 | 3 | — | 2.5 | 2 | — | 2.75 | 0.83 | 2.0 | 3.0% | 2.0% |
| Example 2.6 | 12 | 18 | 0.67 | 30 | 15 | 0.80 | 2 | — | 2.5 | 2 | — | 2.25 | 1.25 | 2.0 | 3.0% | 2.0% |
| Example 2.7 | 12 | 18 | 0.67 | 30 | 15 | 0.80 | — | 2 | 1 | 1 | — | 3 | 0.5 | 1 | 3.3% | 2.3% |
| Example 2.8 | 12 | 18 | 0.67 | 30 | 15 | 0.80 | 2 | 1 | 3 | 1 | — | 6 | 1 | 1.0 | 2.9% | 2.0% |
| Example 2.9 | 12 | 18 | 0.67 | 30 | 15 | 0.80 | 3 | — | — | 2 | — | 1.5 | 0 | 2.0 | 3.0% | 2.0% |
| Example 2.10 | 12 | 18 | 0.67 | 30 | 15 | 0.80 | 0.5 | — | — | 1 | — | 0.5 | 0 | 1.0 | 5.0% | 3.9% |
| Example 2.11 | 12 | 18 | 0.67 | 30 | 15 | 0.80 | 0.5 | — | 1 | 1 | — | 1.5 | 2 | 1.0 | 4.4% | 3.1% |
| Example 2.12 | 12 | 18 | 0.67 | 30 | 15 | 0.80 | 3 | 2 | — | 5 | — | 1 | 0 | 5.0 | 3.7% | 2.4% |
| Example 2.13 | 12 | 18 | 0.67 | 30 | 15 | 0.80 | 3 | 2 | — | 4 | 1 | 1 | 0 | 3.0 | 3.5% | 2.5% |
| Example 2.14 | 12 | 18 | 0.67 | 30 | 15 | 0.80 | 3 | 2 | — | 3 | 1 | 1.25 | 0 | 2.0 | 3.3% | 2.4% |
| Example 2.15 | 12 | 18 | 0.67 | 30 | 15 | 0.80 | 3 | 2 | — | — | 5 | 1 | 0 | ~5.0 | 3.9% | 3.2% |
| Example 2.16 | 12 | 18 | 0.67 | 30 | 15 | 0.80 | 3 | 1 | — | 2 | 0.5 | 1.6 | 0 | 1.5 | 3.0% | 2.0% |
| Example 2.17 | 12 | 18 | 0.67 | 30 | 15 | 0.80 | 3 | 1 | — | 2 | 1 | 1.33 | 0 | 1.0 | 3.0% | 2.0% |
| Example 2.18 | 12 | 18 | 0.67 | 30 | 15 | 0.80 | 2 | — | 1.2 | 2 | 0.8 | 1.14 | 0.6 | 1.2 | 3.0% | 2.0% |
| Example 2.19 | 12 | 18 | 0.67 | 30 | 15 | 0.80 | — | 2 | 1 | 2 | — | 1.5 | 0.5 | 2.0 | 3.5% | 2.5% |
| Example 2.20 | 12 | 18 | 0.67 | 30 | 15 | 0.80 | 3 | — | — | 2 | 1 | 1 | 0 | 1.0 | 3.3% | 2.4% |
| Example 2.21 | 8 | 15 | 0.53 | 23 | 15 | 0.53 | 3 | — | — | 2 | 0.5 | 1.2 | 0 | 1.5 | 3.3% | 2.3% |
| Example 2.22 | 8 | 15 | 0.53 | 23 | 15 | 0.53 | 3 | — | — | 0.5 | — | 6 | 0 | 0 | 4.8% | 4.0% |
| Example 2.23 | 8 | 15 | 0.53 | 23 | 15 | 0.53 | 2 | — | 1 | 0.5 | — | 6 | 0.5 | 0 | 4.5% | 3.9% |

TABLE 3

| Example | Carbonate EC content x | Carbonate PC content y | Positive electrode $I_{003}/I_{104}$ n | Dinitrile Formula I-2 (%) | Trinitrile Formula II-3 (%) | Sultone Formula III-1 (%) | Sultone Formula III-3 (%) | Sultone Formula III-4 (%) | c/(a + b) | High-temperature floating charge thickness swelling rate | Hot-box pass rate |
|---|---|---|---|---|---|---|---|---|---|---|---|
| Example 2.9 | 12 | 18 | 15 | 3 | 2 | — | — | — | 0 | 3.0% | 60% |
| Example 3.1 | 12 | 18 | 15 | 3 | 2 | — | 0.2 | — | 0.04 | 3.0% | 70% |
| Example 3.2 | 12 | 18 | 15 | 3 | 2 | — | 2 | — | 0.4 | 2.8% | 100% |
| Example 3.3 | 12 | 18 | 15 | 3 | 2 | — | 3 | — | 0.6 | 2.7% | 100% |
| Example 3.4 | 12 | 18 | 15 | 3 | 2 | — | 4 | — | 0.8 | 2.5% | 100% |
| Example 3.5 | 12 | 18 | 15 | 3 | 2 | — | 5 | — | 1 | 2.5% | 100% |
| Example 3.6 | 12 | 18 | 15 | 3 | 2 | — | — | 2 | 0.4 | 2.8% | 100% |
| Example 3.7 | 12 | 18 | 15 | 3 | 2 | — | — | 3 | 0.6 | 2.7% | 100% |
| Example 3.8 | 12 | 18 | 15 | 3 | 2 | — | — | 4 | 0.8 | 2.6% | 100% |
| Example 3.9 | 12 | 18 | 15 | 3 | 1 | — | — | 4 | 1.3 | 2.9% | 70% |
| Example 3.10 | 10 | 15 | 15 | 3 | 2 | — | 3 | — | 0.6 | 2.0% | 100% |
| Example 3.11 | 10 | 15 | 15 | 3 | 2 | — | — | 3 | 0.6 | 2.8% | 100% |
| Example 3.12 | 7 | 20 | 15 | 3 | 2 | 1.5 | — | — | 0.3 | 2.8% | 100% |

TABLE 3-continued

| Example | Carbonate | | Positive | Dinitrile | Trinitrile | Sultone | | | | High-temperature floating charge | Hot- |
|---|---|---|---|---|---|---|---|---|---|---|---|
| | EC content x | PC content y | electrode $I_{003}/I_{104}$ n | Formula I-2 (%) | Formula II-3 (%) | Formula III-1 (%) | Formula III-3 (%) | Formula III-4 (%) | c/(a + b) | thickness swelling rate | box pass rate |
| Example 3.13 | 4 | 6 | 15 | 2 | 1 | 0.5 | — | — | 0.17 | 2.9% | 100% |
| Example 3.14 | 12 | 18 | 15 | — | — | — | 2 | — | — | 4.5% | 70% |
| Example 3.15 | 12 | 18 | 15 | — | — | — | 0.5 | — | — | 5.0% | 60% |
| Example 3.16 | 12 | 18 | 15 | — | — | — | 1 | — | — | 4.7% | 60% |
| Example 3.17 | 12 | 18 | 15 | — | — | — | 0.5 | 0.5 | — | 4.6% | 70% |

TABLE 4

| Example | Carbonate | | Positive | | Trinitrile | Sultone | | | | | High-temperature floating charge | High- |
|---|---|---|---|---|---|---|---|---|---|---|---|---|
| | EC content x | PC content y | electrode $I_{003}/I_{104}$ n | Formula I-2 (%) | Formula II-3 (%) | Formula III-3 (%) | $LiBF_4$ (%) | LiBOB (%) | LiDFOB (%) | d/a | thickness swelling rate | temperature cycling resistance |
| Example 2.9 | 12 | 18 | 15 | 3 | 2 | — | | — | — | 0 | 3.0% | 70 |
| Example 3.3 | 12 | 18 | 15 | 3 | 2 | 3 | | — | — | 0 | 2.7% | 68 |
| Example 4.1 | 12 | 18 | 15 | 3 | 2 | — | | 0.05 | — | 0.017 | 2.9% | 65 |
| Example 4.2 | 12 | 18 | 15 | 3 | 2 | — | | 0.1 | — | 0.033 | 3.0% | 62 |
| Example 4.3 | 12 | 18 | 15 | 3 | 2 | — | | 0.15 | — | 0.05 | 3.0% | 58 |
| Example 4.4 | 12 | 18 | 15 | 3 | 2 | — | | 0.2 | — | 0.067 | 3.0% | 55 |
| Example 4.5 | 12 | 18 | 15 | 3 | 2 | — | | 0.3 | — | 0.1 | 3.0% | 50 |
| Example 4.6 | 12 | 18 | 15 | 3 | 2 | — | | 0.5 | — | 0.167 | 3.0% | 48 |
| Example 4.7 | 12 | 18 | 15 | 3 | 2 | — | 0.3 | — | — | 0.1 | 2.9% | 55 |
| Example 4.8 | 12 | 18 | 15 | 3 | 2 | — | 0.5 | — | — | 0.167 | 2.8% | 51 |
| Example 4.9 | 12 | 18 | 15 | 3 | 2 | — | 0.7 | | — | 0.23 | 2.7% | 48 |
| Example 4.10 | 12 | 18 | 15 | 3 | 2 | — | 1.6 | | — | 0.53 | 3.0% | 49 |
| Example 4.11 | 12 | 18 | 15 | 3 | 2 | — | | — | 0.05 | 0.017 | 2.0% | 66 |
| Example 4.12 | 12 | 18 | 15 | 3 | 2 | — | | — | 0.1 | 0.033 | 3.0% | 64 |
| Example 4.13 | 12 | 18 | 15 | 3 | 2 | — | | — | 0.15 | 0.05 | 3.0% | 60 |
| Example 4.14 | 12 | 18 | 15 | 3 | 2 | — | | — | 0.2 | 0.067 | 3.0% | 57 |
| Example 4.15 | 12 | 18 | 15 | 3 | 2 | — | | — | 0.3 | 0.1 | 3.0% | 53 |
| Example 4.16 | 12 | 18 | 15 | 3 | 2 | — | | — | 0.5 | 0.167 | 3.0% | 50 |
| Example 4.17 | 12 | 18 | 15 | 3 | 2 | — | | 0.05 | 0.05 | 0.033 | 3.0% | 63 |
| Example 4.18 | 12 | 18 | 15 | 3 | 2 | — | | 0.1 | 0.2 | 0.1 | 3.0% | 54 |
| Example 4.19 | 12 | 18 | 15 | 3 | 2 | — | | 0.2 | 0.1 | 0.1 | 3.0% | 52 |
| Example 4.20 | 12 | 18 | 15 | 3 | 2 | 3 | | 0.2 | — | 0.067 | 2.7% | 53 |
| Example 4.21 | 12 | 18 | 15 | 3 | 2 | 3 | | — | 0.2 | 0.067 | 1.7% | 55 |

TABLE 5

| Example | Carbonate | | Positive | Dinitrile | Trinitrile | Sultone | | | | High-temperature floating charge | Hot- |
|---|---|---|---|---|---|---|---|---|---|---|---|
| | EC content x | PC content y | electrode $I_{003}/I_{104}$ n | Formula I-2 (%) | Formula II-3 (%) | Formula III-3 (%) | LiBOB (%) | DSC (° C.) | D50 (μm) | thickness swelling rate | box pass rate |
| Example 2.9 | 12 | 18 | 15 | 3 | 2 | — | — | 240 | 14.0 | 3.0% | 60% |
| Example 3.3 | 12 | 18 | 15 | 3 | 2 | 3 | — | 242 | 14.0 | 2.7% | 100% |
| Example 4.5 | 12 | 18 | 15 | 3 | 2 | — | 0.3 | 241 | 14.0 | 3.0% | 60% |
| Example 5.1 | 12 | 18 | 15 | 3 | 2 | — | — | 245 | 14.6 | 2.7% | 80% |
| Example 5.2 | 12 | 18 | 15 | 3 | 2 | — | — | 250 | 15.0 | 2.3% | 100% |
| Example 5.3 | 12 | 18 | 15 | 3 | 2 | — | — | 235 | 15.2 | 2.4% | 100% |
| Example 5.4 | 12 | 18 | 15 | 3 | 2 | — | — | 260 | 15.7 | 2.3% | 100% |
| Example 5.5 | 12 | 18 | 15 | 3 | 2 | — | — | 265 | 16.0 | 2.3% | 100% |

TABLE 5-continued

| Example | Carbonate: EC content x | Carbonate: PC content y | Positive electrode $I_{003}/I_{104}$ n | Dinitrile Formula I-2 (%) | Trinitrile Formula II-3 (%) | Sultone Formula III-3 (%) | LiBOB (%) | DSC (° C.) | D50 (μm) | High-temperature floating charge thickness swelling rate | Hot-box pass rate |
|---|---|---|---|---|---|---|---|---|---|---|---|
| Example 5.6 | 12 | 18 | 15 | 3 | 2 | — | — | 270 | 16.5 | 2.3% | 100% |
| Example 5.7 | 12 | 18 | 15 | 3 | 2 | 3 | — | 250 | 15.0 | 2.2% | 100% |
| Example 5.8 | 12 | 18 | 15 | 3 | 2 | — | 0.3 | 250 | 15.0 | 2.6% | 100% |

TABLE 6

| Example | Carbonate: EC content x | Carbonate: PC content y | Positive electrode $I_{003}/I_{104}$ n | Dinitrile Formula I-2 (%) | Trinitrile Formula II-3 (%) | Sultone Formula III-3 (%) | LiBOB | Thickness of positive electrode active material on one side of positive electrode current collector (μm) | High-temperature floating charge thickness swelling rate | Discharge performance at 2 C rate |
|---|---|---|---|---|---|---|---|---|---|---|
| Example 2.9 | 12 | 18 | 15 | 3 | 2 | — | — | 70 | 3.0% | 70.0% |
| Example 3.3 | 12 | 18 | 15 | 3 | 2 | 3 | — | 70 | 2.7% | 69.0% |
| Example 4.5 | 12 | 18 | 15 | 3 | 2 | — | 0.3 | 70 | 3.0% | 69.0% |
| Example 6.1 | 12 | 18 | 15 | 3 | 2 | — | — | 60 | 3.0% | 75.0% |
| Example 6.2 | 12 | 18 | 15 | 3 | 2 | — | — | 55 | 3.0% | 77.0% |
| Example 6.3 | 12 | 18 | 15 | 3 | 2 | — | — | 50 | 3.0% | 80.0% |
| Example 6.4 | 12 | 18 | 15 | 3 | 2 | — | — | 45 | 3.0% | 85.0% |
| Example 6.5 | 12 | 18 | 15 | 3 | 2 | — | — | 35 | 3.0% | 87.0% |
| Example 6.6 | 12 | 18 | 15 | 3 | 2 | — | — | 30 | 3.0% | 88.0% |
| Example 6.7 | 12 | 18 | 15 | 3 | 2 | 3 | — | 35 | 2.8% | 86.0% |
| Example 6.8 | 12 | 18 | 15 | 3 | 2 | — | 0.3 | 35 | 3.0% | 86.0% |

What is claimed is:

1. An electrochemical apparatus, comprising:

an electrolyte, wherein the electrolyte comprises ethylene carbonate, propylene carbonate, a dinitrile compound and a trinitrile compound; and based on a total weight of the electrolyte, a percentage of the ethylene carbonate is x %, a percentage of the propylene carbonate is y %, a percentage of the dinitrile compound is a % and a percentage of the trinitrile compound is b %, and $0.14 \le x/y < 1$, $a/b \ge 1$, $10 \le x+y \le 40$; and a positive electrode, wherein the positive electrode comprises a positive electrode current collector and a positive electrode active material layer disposed on at least one surface of the positive electrode current collector, the positive electrode active material layer comprises a positive electrode active material, and under an X-ray diffraction (XRD) test, a peak intensity of plane 003 of the positive electrode active material layer is $I_{003}$, a peak intensity of plane 104 of the positive electrode active material layer is $I_{104}$, and a ratio n of $I_{003}$ to $I_{104}$ satisfies $5 \le n \le 25$ and $0.25 \le x/n \le 4$.

2. The electrochemical apparatus according to claim 1, wherein the dinitrile compound comprises at least one of a first dinitrile compound or a second dinitrile compound, wherein the first dinitrile compound comprises at least one of the following formula I-1 to formula I-7:

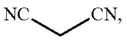
(formula I-1)

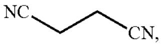
(formula I-2)

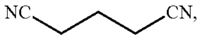
(formula I-3)

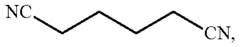
(formula I-4)

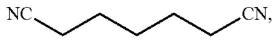
(formula I-5)

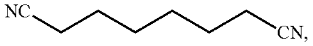
(formula I-6)

or

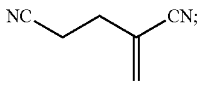
(formula I-7)

and the second dinitrile compound comprises at least one of the following formula I-8 to formula I-12:

(formula I-8)

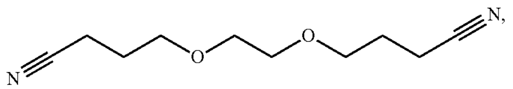

(formula I-9)

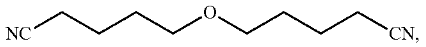

(formula I-10)

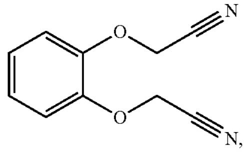

(formula I-11)

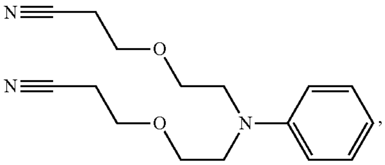

or (formula I-12)

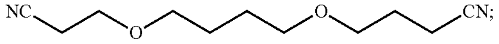

and the trinitrile compound comprises at least one of a first trinitrile compound or a second trinitrile compound, wherein the first trinitrile compound comprises at least one of the following formula II-1 to formula II-4:

(formula II-1)

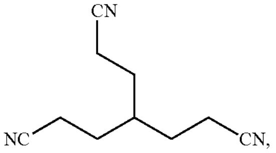

(formula II-2)

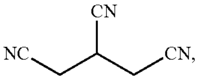

(formula II-3)

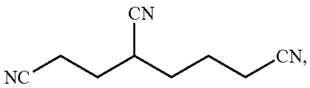

or (formula II-4)

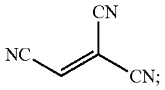

and the second trinitrile compound comprises at least one of the compounds represented by the following formula II-5 or formula II-6:

(formula II-5)

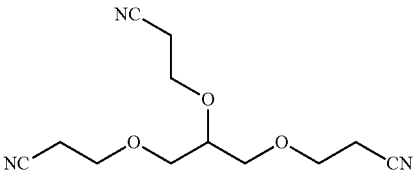

or

-continued (formula II-6)

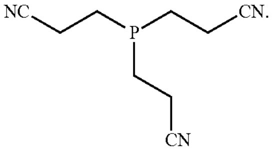

3. The electrochemical apparatus according to claim 2, wherein the electrolyte comprises the first dinitrile compound and the second dinitrile compound, and based on the total weight of the electrolyte, a percentage of the first dinitrile compound is a1% and a percentage of the second dinitrile compound is a2%, wherein $a2/a1<1.3$.

4. The electrochemical apparatus according to claim 2, wherein the electrolyte comprises the first trinitrile compound and the second trinitrile compound, and based on the total weight of the electrolyte, a percentage of the first trinitrile compound is b1% and a percentage of the second trinitrile compound is b2%, wherein $0 \leq b1-b2 \leq \delta$.

5. The electrochemical apparatus according to claim 1, wherein the electrolyte further comprises a sultone compound.

6. The electrochemical apparatus according to claim 5, wherein the sultone compound comprises at least one of the following formula III-1 to formula III-9:

(formula III-1)

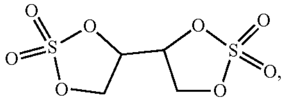

(formula III-2)

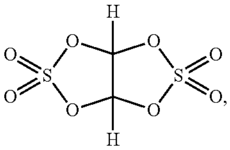

(formula III-3)

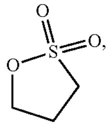

(formula III-4)

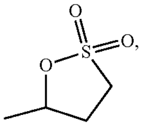

(formula III-5)

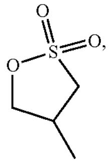

(formula III-6)

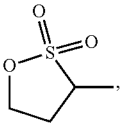

-continued (formula III-7)

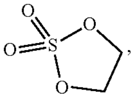

(formula III-8)

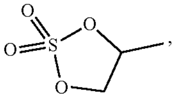

, or (formula III-9)

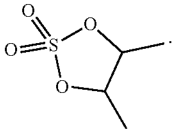

7. The electrochemical apparatus according to claim 1, wherein the electrolyte further comprises a sultone compound, and based on the total weight of the electrolyte, a percentage of the sultone compound is c %, wherein $0.05 \leq c/(a+b) \leq 1$.

8. The electrochemical apparatus according to claim 7, wherein the sultone compound comprises at least one of the following formula III-1 to formula III-9:

(formula III-1)

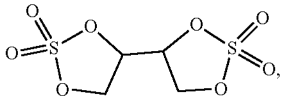

(formula III-2)

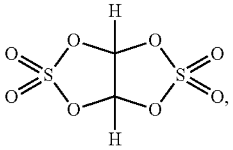

(formula III-3)

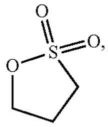

(formula III-4)

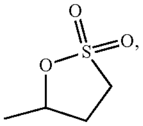

(formula III-5)

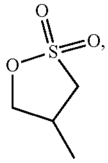

(formula III-6)

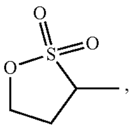

-continued (formula III-7)

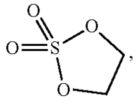

(formula III-8)

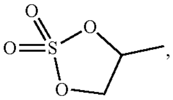

, or (formula III-9)

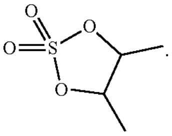

9. The electrochemical apparatus according to claim 1, wherein the electrolyte further comprises a boron-containing lithium salt, and the boron-containing lithium salt comprises at least one of lithium oxalate borate, lithium difluorooxalate borate, lithium tetrafluoroborate, or lithium borate.

10. The electrochemical apparatus according to claim 9, wherein based on the total weight of the electrolyte, a percentage of the boron-containing lithium salt is d %, wherein $d/a \leq 0.5$.

11. The electrochemical apparatus according to claim 1, wherein the positive electrode active material contains element M, and the element M contains at least one of Zn, Ti, Al, W, Zr, Nb, Y, or Sb.

12. The electrochemical apparatus according to claim 1, wherein in differential scanning calorimetry (DSC) analysis, the positive electrode active material layer has an exothermic peak between 240° C. and 270° C.

13. The electrochemical apparatus according to claim 1, wherein a thickness of the positive electrode active material layer on one side of the positive electrode current collector ranges from 25 μm to 70 μm.

14. An electronic apparatus, comprising an electrochemical apparatus, wherein the electrochemical apparatus comprises:

an electrolyte, wherein the electrolyte comprises ethylene carbonate, propylene carbonate, a dinitrile compound and a trinitrile compound; and based on a total weight of the electrolyte, a percentage of the ethylene carbonate is x %, a percentage of the propylene carbonate is y %, a percentage of the dinitrile compound is a % and a percentage of the trinitrile compound is b %, and $0.14 \leq x/y < 1$, $a/b \geq 1$, $10 \leq x+y \leq 40$; and a positive electrode, wherein the positive electrode comprises a positive electrode current collector and a positive electrode active material layer disposed on at least one surface of the positive electrode current collector, the positive electrode active material layer comprises a positive electrode active material; and under an X-ray diffraction (XRD) test, a peak intensity of plane 003 of the positive electrode active material layer is $I_{003}$, a peak intensity of plane 104 of the positive electrode active material layer is $I_{104}$, and a ratio n of $I_{003}$ to $I_{104}$ satisfies $5 \leq n \leq 25$ and $0.25 \leq x/n \leq 4$.

* * * * *